(12) United States Patent
Monaci (10) Patent No.: US 12,463,564 B2
(45) Date of Patent: Nov. 4, 2025

(54) BRAKING DISENGAGEMENT SWITCH FOR A DRIVE WHEEL DRIVEN BY AN ELECTRIC MOTOR

(71) Applicant: Aldebaran, Paris (FR)

(72) Inventor: Alexis Monaci, Paris (FR)

(73) Assignee: ALDEBARAN, Paris (FR)

( * ) Notice: Subject to any disclaimer, the term of this patent is extended or adjusted under 35 U.S.C. 154(b) by 190 days.

(21) Appl. No.: 18/385,303

(22) Filed: Oct. 30, 2023

(65) Prior Publication Data

US 2024/0154545 A1 May 9, 2024

(30) Foreign Application Priority Data

Nov. 4, 2022 (FR) ........................................ 2211514

(51) Int. Cl.
*H02P 3/22* (2006.01)
*B60L 15/20* (2006.01)
*H03H 7/01* (2006.01)

(52) U.S. Cl.
CPC ............ *H02P 3/22* (2013.01); *B60L 15/2009* (2013.01); *H03H 7/0115* (2013.01)

(58) Field of Classification Search
CPC ...... B60L 3/00; B60L 7/00; B60L 7/06; B60L 7/22; H02P 6/24
See application file for complete search history.

(56) References Cited

U.S. PATENT DOCUMENTS

2019/0199231 A1 6/2019 Stark
2021/0367537 A1* 11/2021 Yamamoto ............. H02P 27/06

FOREIGN PATENT DOCUMENTS

| EP | 2 033 835 A2 | 3/2009 |
| EP | 2 338 752 A1 | 6/2011 |
| EP | 2 570 290 A1 | 3/2013 |
| FR | 3 035 557 A1 | 10/2016 |

* cited by examiner

*Primary Examiner* — Said Bouziane
(74) *Attorney, Agent, or Firm* — BakerHostetler (57) ABSTRACT

A braking disengagement switch for a drive wheel driven by a two-phase electric motor, the switch comprising a first disengagement channel connected at a first end to a phase of the motor and to a second phase of the motor at a second end, the first channel switching between an open state and a closed state, the switch comprising a device for monitoring the first channel, the monitoring device comprising: a first transmitter connected to the first end of the first disengagement channel, configured to inject a first state signal between the first end of the first disengagement channel and the motor phase of the electric motor; a first receiver connected to the second end of the first disengagement channel, configured to detect the first signal passing through the first channel when the first channel is in the closed state, the first receiver being configured to determine the state of the first channel.

16 Claims, 5 Drawing Sheets

BRAKING DISENGAGEMENT SWITCH FOR A DRIVE WHEEL DRIVEN BY AN ELECTRIC MOTOR

CROSS-REFERENCE TO RELATED APPLICATION

This application claims priority to foreign French patent application No. FR 2211514, filed on Nov. 4, 2022, the disclosure of which is incorporated by reference in its entirety.

FIELD OF THE INVENTION

The invention relates to a drive wheel intended to move a vehicle and to a device for electrically braking this drive wheel.

BACKGROUND

Conventionally, multi-wheeled vehicles are equipped with drive wheels notably allowing them to be driven in a desired direction. The wheels are generally set into rotation by means of an electric motor directly connected to each wheel.

Currently, it is known for a motorised assembly, called motor-wheel assembly, to be used. The motor-wheel assembly is an assembly comprising a motor directly incorporated into the drive wheel, which motor is capable of propelling the vehicle. The main advantages of this type of motor-wheel system are its compact size and the fact that it does not require a transmission between the motor and the wheel.

During the moving phase of the vehicle, it is necessary, for obvious safety reasons, to be able to allow the driven vehicle to brake and stop when an obstacle or danger is detected. Several solutions exist, such as installing a mechanical braking means, such as a pad or a disc, directly on the wheel in order to slow down its rotation, or even installing a magnetic type braking means directly on the motor so as to dissipate some of the braking energy.

These braking means are actually essential during the autonomy and moving phases of the vehicle, but have major disadvantages when the vehicle is controlled during a phase when it is no longer autonomous. This involves, for example, phases when the vehicle is being moved by a user pushing or towing it between different locations, or even in a situation when the vehicle malfunctions or is inoperative and needs to be assisted in order to move.

Indeed, with the electric motor being directly connected to the drive wheel, it is impossible to attempt to move the drive wheel, by pushing or towing the vehicle, for example, without experiencing resistance from or damage to the electric motor.

A disengagement component then needs to be added between the electric motor and the drive wheel driven by the electric motor. However, this addition considerably increases the size of the motor-wheel assembly, which is a disadvantage of this addition.

SUMMARY OF THE INVENTION

The invention aims to overcome all or some of the aforementioned problems by proposing a device for disengaging the braking of the drive wheel that can be easily incorporated into the motor-wheel system, and that can operate when the vehicle is turned off or on and that is compact.

To this end, the subject matter of the invention is a braking disengagement switch for a drive wheel set into rotation by an electric motor comprising at least two motor phases, the braking disengagement switch comprising a first disengagement channel intended to be connected at a first end of the first disengagement channel to a motor phase of the electric motor and to a second motor phase of the electric motor at a second end of the first disengagement channel, the first disengagement channel being configured to switch between an open state and a closed state, the braking disengagement switch comprising a device for monitoring the state of the first disengagement channel, the monitoring device comprising:
 a first state transmitter connected to the first end of the first disengagement channel, configured to inject a first state signal between the first end of the first disengagement channel and the motor phase of the electric motor;
 a first state receiver connected to the second end of the first disengagement channel, the first state receiver being configured to detect the first state signal passing through the first disengagement channel when the first disengagement channel is in the closed state, the first state receiver being configured to determine the state of the first disengagement channel.

According to one aspect of the invention, the first state transmitter comprises:
 a first controller configured to generate the first state signal;
 a first transistor connected to the first controller at a first terminal, connected to a power supply at a second terminal and comprising a third terminal;
 a second transistor connected to the first controller via a first terminal, connected to a ground via a third terminal and connected to the third terminal of the first transistor via a second terminal;
 a first filtering means connected at a first terminal of the first filtering means to the third terminal of the first transistor and to the second terminal of the second transistor and at a second terminal of the first filtering means to the first end of the first disengagement channel.

According to one aspect of the invention, the first state signal is a periodic signal with a frequency that is greater than or equal to 100 kHz.

According to one aspect of the invention, the braking disengagement switch comprises a first filter positioned between the motor phase of the electric motor and the first end of the first disengagement channel, with the first filter being configured to receive and filter a signal from the motor phase of the electric motor.

According to one aspect of the invention, the first filter is a low-pass filter.

According to one aspect of the invention, the first filter is a T-type filter comprising two inductors and a capacitor.

According to one aspect of the invention, the braking disengagement switch comprises a third filter connected to the second end of the first disengagement channel, configured to filter the first state signal transmitted by the first state transmitter.

According to one aspect of the invention, the braking disengagement switch comprises a second disengagement channel connected to the motor phase of the electric motor at a first end of the second disengagement channel and to the second motor phase of the electric motor at a second end of the second disengagement channel, the second disengagement channel being configured to switch between an open state and a closed state, the second disengagement channel being configured to be in the same state as the first disengagement channel, the monitoring device being configured to monitor the state of the second disengagement channel, the monitoring device comprising:

a second state transmitter connected to the first end of the second disengagement channel, configured to inject a second state signal between the first end of the second disengagement channel and the motor phase of the electric motor;

a second state receiver connected to the second end of the second disengagement channel, the second state receiver being configured to detect the second state signal passing through the second disengagement channel when the second disengagement channel is in the closed state, the second state receiver being configured to determine the state of the second disengagement channel;

a device for diagnosing the state of the disengagement switch, the diagnostic device being connected to the first state receiver and to the second state receiver, the diagnostic device being configured to compare the state of the first disengagement channel and the state of the second disengagement channel, the diagnostic device being configured to determine, on the basis of the comparison, whether the disengagement switch is in a functioning state or in a malfunctioning state.

According to one aspect of the invention, the second state transmitter comprises:

a second controller configured to generate the second state signal;

a third transistor comprising a first terminal of the third transistor connected to the second controller and comprising a second terminal of the third transistor connected to a power supply and comprising a third terminal;

a fourth transistor comprising a first terminal of the fourth transistor connected to the second controller and comprising a third terminal of the fourth transistor connected to a ground and comprising a second terminal of the fourth transistor connected to the third terminal of the third transistor;

a second filtering means connected at a first terminal of the second filtering means to the second terminal of the fourth transistor and to the third terminal of the third transistor and at a second terminal of the second filtering means to the first end of the second disengagement channel.

According to one aspect of the invention, the second state signal is a periodic signal with a frequency that is greater than or equal to 100 kHz.

According to one aspect of the invention, the braking disengagement switch comprises a second filter positioned between the motor phase of the electric motor and the first end of the second disengagement channel, configured to receive and filter a signal from the motor phase of the electric motor.

According to one aspect of the invention, the second filter is a low-pass filter.

According to one aspect of the invention, the second filter is a T-type filter comprising two inductors and a capacitor.

According to one aspect of the invention, the braking disengagement switch comprises a fourth filter connected to the second end of the second disengagement channel, configured to filter the second state signal transmitted by the second state transmitter.

According to one aspect of the invention, the electric motor comprises three motor phases, with the motor phase being a motor phase from among the first motor phase or the third motor phase.

The invention also relates to a vehicle configured to move in a travel zone, the vehicle comprising the braking disengagement switch.

BRIEF DESCRIPTION OF THE DRAWINGS

The invention will be better understood and further advantages will become apparent from reading the detailed description of an embodiment that is provided by way of an example, which description is illustrated by the accompanying drawings, in which.

For the sake of clarity, the same elements will use the same reference signs throughout the various figures.

DETAILED DESCRIPTION

Figure 1:
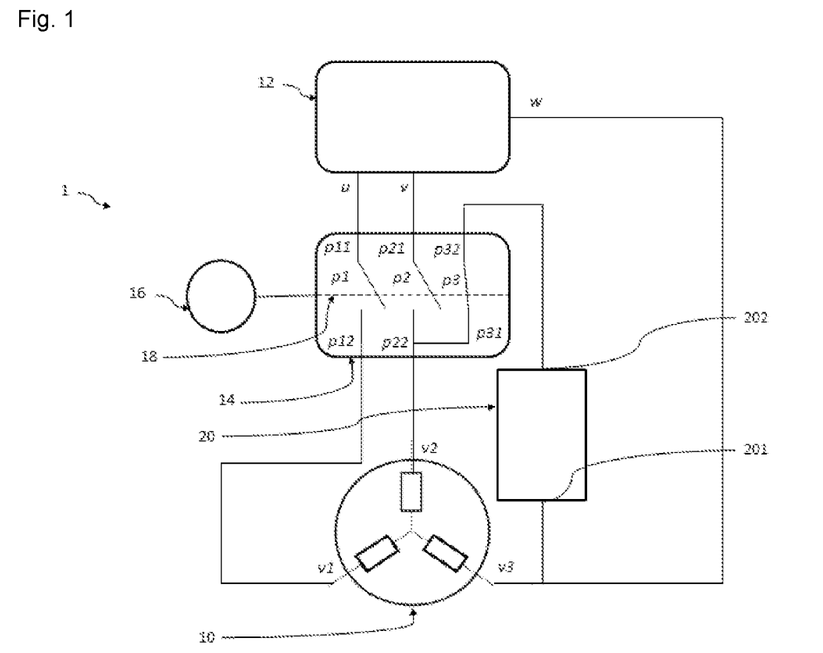
FIG. 1 shows a schematic view of a drive wheel braking device in a braking configuration comprising a drive wheel braking disengagement switch according to the invention.

FIG. 1 shows a schematic view of a braking device 1 for a drive wheel mounted on a vehicle. This type of moving vehicle can comprise a plurality of drive wheels driven by an electric motor.

The braking device 1 therefore comprises a three-phase electric motor 10, with a rated power of less than one kilowatt, configured to set the drive wheel into rotation. The electric motor 10 is supplied by a controller 12, which delivers 3 voltages (u, v, w), with each control voltage (u, v, w) being respectively connected to a motor phase (v1, v2, v3) of the three-phase electric motor 10. The electric motor 10 is a star-connected three-phase motor, thus allowing the electric motor 10 to experience a reduced voltage. By way of an indicative example, the controller 12 is made up of a chopper or an inverter interrupting a pulse width modulation voltage with a frequency that is greater than 10 kHz.

As an alternative embodiment, the electric motor 10 is a delta-connected three-phase motor.

The braking device 1 also comprises a three-channel (p1, p2, p3) electromechanical safety relay 14. The electromechanical safety relay 14 comprises a first channel p1 connected, at a first control voltage u of the controller 12, to a first end p11 of the first channel p1 and to a first motor phase v1 of the electric motor 10 at a second end p12 of the first channel p1. The electromechanical safety relay 14 comprises a second channel p2 connected, at a second control voltage v of the controller 12, to a first end p21 of the second channel p2 and to a second motor phase v2 of the electric motor 10 at a second end p22 of the second channel p2. The electromechanical safety relay 14 comprises a third channel p3 connected to the second motor phase v2 of the electric motor 10 at a first end p31 of the third channel p3 and to a third motor phase v3 of the electric motor 10 at a second end p32 of the third channel p3.

Figure 2:
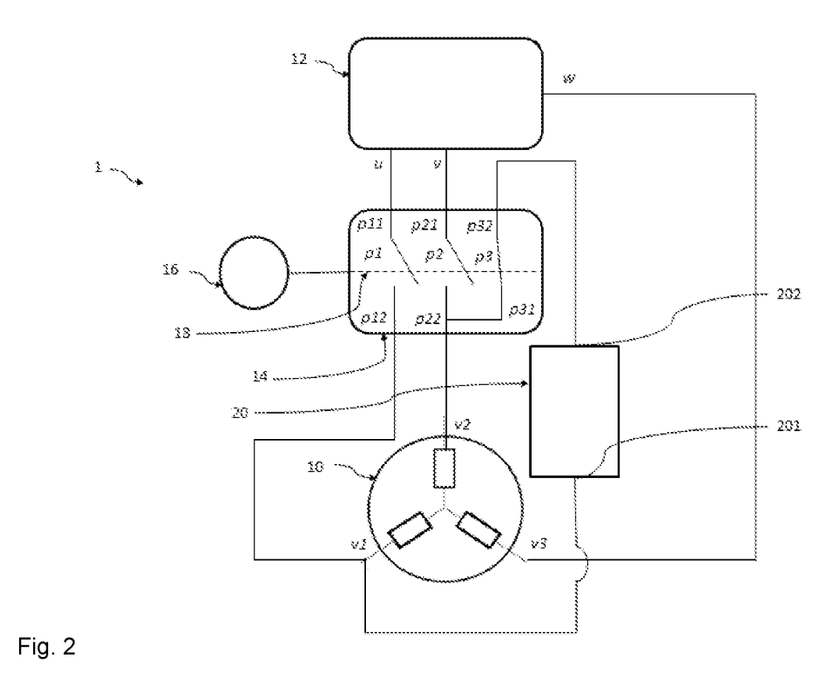
FIG. 2 shows a schematic view of the drive wheel braking device of FIG. 1 in a second architectural configuration.

According to an alternative embodiment shown in FIG. 2, it is possible to contemplate the third channel p3 being connected to the second motor phase v2 of the electric motor 10 at the first end p31 of the third channel p3 and to the first motor phase v1 of the electric motor 10 at the second end p32 of the third channel p3.

The first channel p1, the second channel p2 and the third channel p3 are configured to switch between an open state and a closed state. Indeed, the first channel p1, the second channel p2 and the third channel p3 function as switches between the controller 12 and the electric motor 10. Therefore, when the first channel p1 is in a closed or on state with respect to the current, the first control voltage u is connected to the first motor phase v1 so that the first motor phase v1 is supplied with current. Conversely, when the first channel p1 is in an open or off state with respect to the current, the first motor phase v1 is then no longer supplied with current by the first control voltage u of the controller 12.

Furthermore, similarly, when the second channel p2 is in a closed or on state with respect to the current, the second control voltage v is connected to the second motor phase v2 so that the second motor phase v2 is supplied with current. Conversely, when the second channel p2 is in an open or off state with respect to the current, the second motor phase v2 is then no longer supplied with current by the second control voltage v of the controller 12.

Furthermore, finally, when the third channel p3 is in a closed or on state with respect to the current, the third motor phase v3 in the configuration of FIG. 1, or the first motor phase v1 in the configuration of FIG. 2, is connected to the second motor phase v2 so as to interconnect two motor phases v2 and v3 of the electric motor 10 and to generate a short-circuit current between these two motor phases, namely v2 and v3 in the configuration of FIG. 1, or v2 and v1 in the configuration of FIG. 2. Conversely, when the third channel p3 is in an open or off state, the third motor phase v3 in the configuration of FIG. 1, or the first motor phase v1 in the configuration of FIG. 2, is then no longer connected to the second motor phase v2 of the electric motor 10, with the third motor phase v3 still being connected to the third control voltage w of the controller 12.

The electromechanical safety relay 14 also comprises a common control component 16 for the first, second and third channels (p1, p2, p3) configured to simultaneously control the first channel, the second channel and the third channel (p1, p2, p3). The common control component 16 is, by way of an indicative example, a mechanical actuator allowing almost simultaneous switching of the first channel p1, the second channel p2 and the third channel p3 to be generated from one state to another from among the open state or the closed state. In other words, when the first, second or third channel (p1, p2, p3) switches between the open state and the closed state, then the other channels also switch between the open state and the closed state.

As an alternative embodiment, the common control component 16 also can be an electrical actuator for simultaneously controlling the first channel, the second channel and the third channel (p1, p2, p3).

The electromechanical safety relay 14 also comprises a safety component 18 configured to generate interdependency between the first channel p1, the second channel p2 and the third channel p3.

In addition, the first channel p1 and the second channel p2 are in an opposite state to the third channel p3. In other words, when the first channel p1 is in a closed state, then the second channel p2 is also in a closed state and the third channel p3 is in an open state. Therefore, if the first channel p1 is in the closed state, then:

the first motor phase v1 and the second motor phase v2 are supplied via the first and second channels p1 and p2 of the electromechanical safety relay 14, given that the third motor phase v3 is continuously supplied by the third control voltage w;

and the second motor phase v2 and the third motor phase v3 are not connected to each other, thus avoiding generating a short-circuit between these two motor phases in the configuration of FIG. 1. In the configuration of FIG. 2, it is then the second motor phase v2 and the first motor phase v1 that are not connected to each other, thus avoiding generating a short-circuit between these two motor phases.

The same applies if it is the second channel p2 that is in the closed state or if it is the third channel p3 that is in the open state.

Furthermore, if the first channel p1 is in the open state, then:

the first motor phase v1 is not supplied by the controller 12;

the second motor phase v2 is also not supplied by the controller 12, given that the third motor phase v3 is continuously supplied by the third control voltage w;

and the second motor phase v2 and the third motor phase v3 are connected to each other, in the configuration of FIG. 1, thus generating a short-circuit between these two motor phases, the short-circuit current generated between the second motor phase v2 and the third motor phase v3 then being able to be understood to be a braking current for the electric motor 10. This braking current then generates magnetic braking of the electric motor 10. In the configuration of FIG. 2, this is then the second motor phase v2 and the first motor phase v1.

Thus, the common control component 16 allows all the channels of the electromechanical safety relay 14 to be activated by a single action and the safety component 18 allows this interdependency to be generated between the first, second and third channels (p1, p2, p3) and prevents any switching of the state in the event of a malfunction of one of the first, second or third channels (p1, p2, p3). Indeed, if the first channel p1 or the second channel p2 is, for example, blocked in the closed state, or is stuck, then the safety component 18 prevents any switching of the other channel from among the first channel p1 and the second channel p2 that is not blocked in the closed state and of the third channel p3 from the open state to the closed state, thus preventing damage to the electromechanical safety relay 14 or the controller 12.

According to a second indicative example, if the third channel p3 is blocked in the open state, then the safety component 18 prevents any switching of the first channel p1 and of the second channel p2 that are not blocked in the closed state.

Thus, the electromechanical safety relay 14 is configured to allow, according to a first configuration of the electromechanical safety relay, the electric motor 10 to be supplied with voltage by the controller 12 by inducing the connection between the first control voltage u and the first motor phase v1, as well as the electrical connection between the second control voltage v and the second motor phase v2, with the third motor phase v3 being continuously supplied by the third control voltage w, and to allow, according to a second configuration or braking configuration, simultaneous interruption of the electrical connection between the controller 12, and particularly the first control voltage u and the second control voltage v, and the first and second motor phases v1 and v2 of the electric motor 10, and to allow a braking current to be generated between the second motor phase v2 of the electric motor 10 and the third motor phase v3 of the electric motor 10.

Furthermore, the term "simultaneous" is understood to mean that the first channel p1, the second channel p2 and the third channel p3 switch from one state to another state in a short period of time or even instantaneously when one of the channels (p1, p2, p3) switches state between the closed state and the open state by activating the common control component 16. The term "short period of time" is understood to mean a switching time of less than 200 ms. In addition, preferably, simultaneous switching of all the channels (p1, p2, p3) of the electromechanical safety relay 14 begins with switching the first channel p1 and the second channel p2, then switching the third channel p3 so as to avoid supplying the electric motor at the three motor phases (v1, v2, v3), while generating the short-circuit between the second motor phase v2 and the third motor phase v3 in the configuration of FIG. 1, or between the second motor phase v2 and the first motor phase v1 in the configuration of FIG. 2, which significantly degrades the electromechanical safety relay 14 or the controller 12.

As an alternative embodiment, simultaneously switching all the channels (p1, p2, p3) of the electromechanical safety relay 14 begins with switching the third channel p3, then switching the first channel p1 and the second channel p2, with switching of the first channel p1 and the second channel p2 occurring within a limited period of time after switching the third channel p3 so as to avoid excessively affecting the electromechanical safety relay 14 or the controller 12.

Thus, during the braking configuration, the electric motor 10 is only supplied with current by the controller 12 via the third motor phase v3, which is continuously connected to the control voltage w. The first and second motor phases v1 and v2 are isolated from the controller 12 due to the open state of the first channel p1 and the open state of the second channel p2 of the electromechanical safety relay 14. In addition, opening the first channel p1 and the second channel p2 induces, according to the architectural configuration of the electromechanical safety relay 14, a closed state of the third channel p3. The third channel p3 then connects the second motor phase v2 and the third motor phase v3 in the configuration of FIG. 1, or the second motor phase v2 and the first motor phase v1 in the configuration of FIG. 2, so as to generate a braking current between these two motor phases. Consequently, the same voltage can be respectively observed between the second motor phase v2 and the third motor phase v3 in the configuration of FIG. 1, or between the second motor phase v2 and the first motor phase v1 in the configuration of FIG. 2, and it is possible to observe, during a rotation in three motor phases (v1, v2, v3), blocking on the second motor phase v2 and on the third motor phase v3, while the first motor phase v1 is left free, i.e., no current can be fed back via another motor phase, namely, the second motor phase v2 or the third motor phase v3, and no current can be injected by the controller 12 since only one motor phase, namely, the third motor phase v3, is connected, in the configuration of FIG. 1. In the configuration of FIG. 2, it can then be observed that it is the second motor phase v2 and the first motor phase v1 that are blocked.

This braking torque or magnetic braking induced by the braking current between the second motor phase v2 and the third motor phase v3 in the configuration of FIG. 1, or between the second motor phase v2 and the first motor phase v1 in the configuration of FIG. 2, has the advantage, compared with a short-circuit of the three motor phases, of reducing the braking torque and therefore greatly reducing potential skidding of the drive wheel and of the motorised vehicle, improving the safety aspect of the drive wheel. Furthermore, short-circuiting only two motor phases (v2, v3 or v2, v1) also has the advantage, by limiting the potential for skidding, of providing a reliable measurement of the distance travelled based on the rotation of the drive wheel and specifying the odometry measurements associated with the drive wheel.

Thus, the drive wheel can assume two binary configurations, either the drive wheel is driven by the electric motor 10 according to the technical features of the electric motor, for example, the speed of rotation of the rotor of the electric motor 10, or the drive wheel is braked by means of the braking configuration of the electromechanical safety relay 14, inducing a braking torque on the electric motor. Furthermore, when the vehicle that is moving by means of the drive wheel is turned off, it is the braking configuration that is present by default. As such, it is then not possible to contemplate completely disconnecting the drive wheel from the electric motor 10 so as to release the drive wheel from any influence from the electric motor 10.

In order to allow the drive wheel to be disconnected from the electric motor 10, notably when the braking torque is detectable and is applied between the second motor phase v2 and the third motor phase v3 in the configuration of FIG. 1, a braking disengagement switch 20 is connected to the second end p32 of the third channel p3 via a second terminal 202 of the disengagement switch 20 and to the third motor phase v3 of the electric motor 10 at a first terminal 201 of the first disengagement switch 20. In the configuration of FIG. 2, the first terminal 201 of the first disengagement switch 20 is connected to the first motor phase v1 of the electric motor 10.

The braking disengagement switch 20 can be, for example, a mechanical element capable of disengaging even when there is no power supply.

As an alternative embodiment, the braking disengagement switch 20 can be an electrical element, such as a transistor or an electromechanical element, such as an electromechanical relay, capable of operating when the vehicle is turned on or if braking is not present by default when the vehicle is turned off.

In a similar way to the channels (p1, p2, p3) of the electromechanical safety relay 14, the disengagement switch 20 is configured to switch between an open state, not allowing current through, and a closed state, allowing current through.

The disengagement switch 20 thus allows the connection between the second motor phase v2 and the third motor phase v3 to be prevented in the configuration of FIG. 1, notably when the third channel p3 is in the closed state and a short-circuit current, or braking current, is detected and applied between the second motor phase v2 and the third motor phase v3. Thus, the second motor phase v2 is disengaged from the third motor phase v3 and braking on the electric motor 10 is no longer applied. The electric motor 10, and therefore the drive wheel, are then left free since controlling solely the third motor phase v3 with the controller 12 is not sufficient for driving the electric motor 10 without current being fed back to the controller 12.

Figure 3:
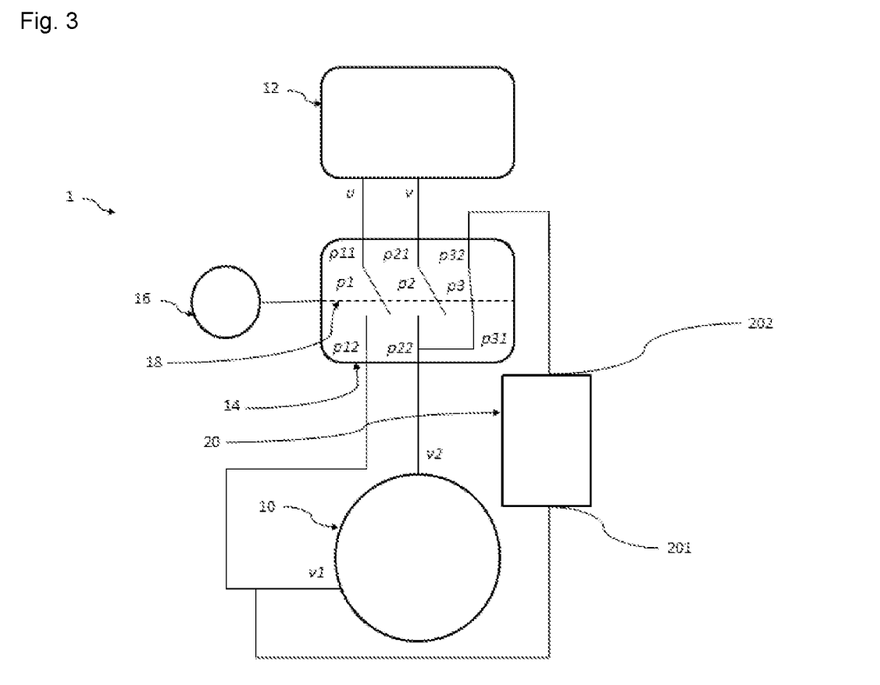
FIG. 3 shows a schematic view of a drive wheel braking device in a braking configuration comprising a drive wheel braking disengagement switch according to an alternative embodiment with a two-phase electric motor.

In another alternative embodiment, illustrated in FIG. 3, the electric motor 10 can be a two-phase motor comprising only the first motor phase v1 and the second motor phase v2. The controller 12 can then comprise only two control voltages (u, v), respectively connected to the first motor phase v1 and to the second motor phase v2.

In this configuration, the braking disengagement switch 20 allows the first motor phase v1 and the second motor phase v2 to be connected together. More specifically, the first terminal 201 of the first braking disengagement switch 20 is connected to the first motor phase v1 and the second terminal 202 of the first braking disengagement switch 20 is connected to the second motor phase v2. Thus, the first motor phase v1 can be disengaged from the second motor phase v2 and none of the motor phases between the first motor phase v1 and the second motor phase v2 is traversed by a current originating from the controller 12 and no return current can flow towards the controller 12.

Furthermore, the electromechanical safety relay 14 can then comprise only the first channel p1 and the third channel p3 switching to states identical to those described above.

Finally, it is also possible to contemplate that the electric motor 10 is a DC motor.

Throughout the remainder of the description, the braking disengagement switch 20 is arranged between the second motor phase v2 and the third motor phase v3, as shown in the configuration of FIG. 1. Nevertheless, a person skilled in the art can adapt the details of the architecture of the braking disengagement switch 20 in an identical manner for the configuration of FIG. 2 and of FIG. 3.

Figure 4:
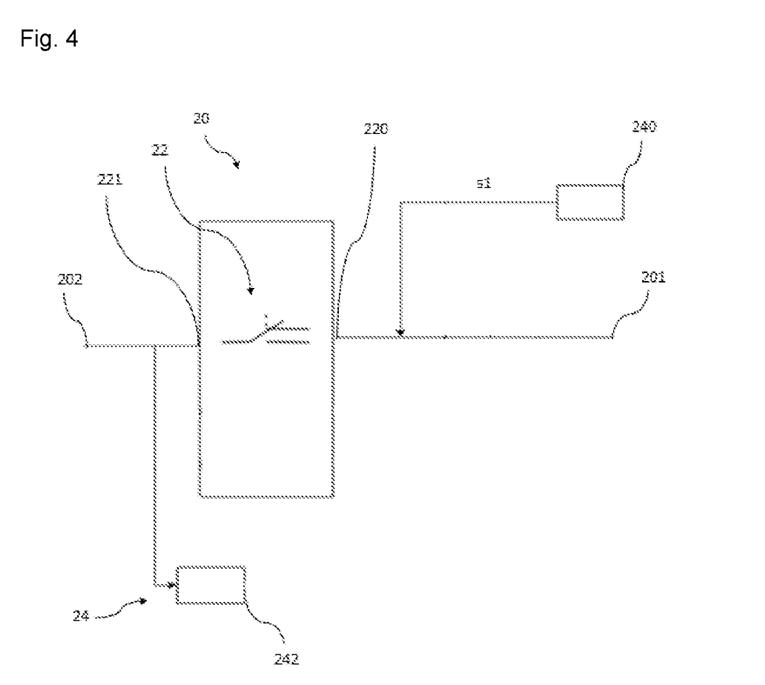
FIG. 4 shows a schematic view of the drive wheel braking disengagement switch according to the invention.

FIG. 4 shows an exploded schematic view of the braking disengagement switch 20 for the drive wheel set into rotation by the electric motor 10 shown in FIG. 1.

The braking disengagement switch 20 is thus arranged between the second motor phase v2 of the electric motor 10, via the third channel p3, and the third phase v3 of the electric motor 10. More specifically, the braking disengagement switch 20 is connected to the second motor phase v2 of the electric motor 10 via the second terminal 202, which is connected to the third channel p3 and to the third phase v3 of the electric motor 10 via the first terminal 201. Indeed, the braking disengagement switch 20 is arranged so as to open the connection between the second motor phase v2 and the third motor phase v3, thus allowing the braking torque to be suppressed when the braking disengagement switch 20 is open.

It also should be noted that the direction of the first terminal 201 and of the second terminal 202 can be reversed. In other words, the first terminal 201 can be connected to the second motor phase v2, while the second terminal 202 can be connected to the first motor phase v1 in the configuration of FIG. 2 or to the third motor phase v3 in the configuration of FIG. 1.

The braking disengagement switch 20 comprises a first disengagement channel 22 connected at a first end 220 of the first disengagement channel 22 to the third motor phase v3 of the electric motor 10 and to the second phase v2 of the electric motor 10 at a second end 221 of the first disengagement channel 22. More specifically, the first end 220 is connected to the first terminal 201 and the second end 221 is connected to the second terminal 202.

The first disengagement channel 22 is configured to switch between an open state and a closed state, like a switch. Consequently, when the first disengagement channel 22 is in a closed or on state with respect to the current, the second motor phase v2 is connected to the third motor phase v3 so that the braking current inducing the braking torque is detectable between these two motor phases. Conversely, when the first disengagement channel 22 is in an open or off state with respect to the current, the braking current inducing the braking torque is no longer transmitted between the first end 220 of the first disengagement channel 22 and the second end 221 of the first disengagement channel 22.

In addition, the braking disengagement switch 20 comprises a device 24 for monitoring the state of the first disengagement channel. The monitoring device 24 is configured to determine the state of the first disengagement channel 22 at any time.

The monitoring device 24 comprises a first state transmitter 240 connected to the first end 220 of the first disengagement channel 22, configured to inject a first state signal s1 between the first end 220 of the first disengagement channel 22 and the motor phase of the electric motor 10 connected to the first disengagement channel 22 from among the first motor phase v1, as shown in FIG. 2, or the third motor phase v3, as shown in FIG. 1. According to a preferred configuration, the first state transmitter 240 is connected to the first disengagement channel 20 between the first end 220 of the first disengagement channel 22 and the first terminal 201 of the braking disengagement switch 20. As shown in FIG. 4, the first state transmitter 240 is connected to the first end 220 of the first disengagement channel 22 so as to directly inject the first state signal s1 into the first disengagement channel 22. The first state transmitter 240 is positioned so as to inject the first state signal s1 from the first terminal 201 to the second terminal 202 by passing through the first disengagement channel 22. In other words, the first state transmitter 240 is connected to an electrical line connecting the first end 220 of the first disengagement channel 22 and the first motor phase v1 of the electric motor 10, in the case of FIG. 2, or to the third motor phase v3 of the electric motor 10, in the case of FIG. 1, and is configured to inject the first state signal s1 towards the first end 220, between the first end 220 of the first disengagement channel 22 and the first motor phase v1 of the electric motor 10, according to the architecture of FIG. 2, or the third motor phase v3 of the electric motor 10, according to the architecture of FIG. 1.

Although the first state signal s1 is transmitted between the first end of the first disengagement channel 22 and the first motor phase v1 of the electric motor 10, as shown in FIG. 2, the first state signal s1 is not able to pass through the electric motor from the first motor phase to the second motor phase and is blocked by the windings of the electric motor 10.

Indeed, the first state signal s1 is a high-frequency (HF) signal, with a frequency high enough to be filtered by the windings of the electric motor 10. As the electric motor 10 is made up of windings around teeth made of magnetic materials, which naturally create high inductance, of the order of a few millihenries, this high inductance of the winding of the electric motor 10 advantageously allows the first state signal s1 to be blocked between the phases of the electric motor 10. In order to be filtered and blocked by the electric motor 10, the first state signal s1 is therefore a high-frequency signal relative to the inductance of the electric motor 10.

There is a ratio between the inductance L measurable on the electric motor 10 and the frequency $f_1$ of the first state signal s1. This ratio is preferably greater than $10^7$. In other words, the impedance relationship on the electric motor 10, according to the formula $JL\omega$, where J represents the complex number, L represents the inductance of the electric motor 10 and $\omega_1$ represents the pulse of the first state signal s1, with $\omega_1 = 2\pi f_1$, with $f_1$ being the frequency of the first state signal s1, must be greater than or equal to 100 ohms.

The first state transmitter 240 therefore continuously transmits a high-frequency periodic signal, namely the first state signal s1. By way of an indicative example, the first state transmitter 240 can transmit the first state signal s1 at a frequency of more than 100 kHz and the inductance of the electric motor 10 can be equal to 1 millihenry.

The monitoring device 24 also comprises a first state receiver 242 connected to the second end 221 of the first disengagement channel 22. The first state receiver 242 is configured to detect the first state signal s1 passing through the first disengagement channel 22 when the first disengagement channel is in the closed state. It is thus possible to know the switching state of the first disengagement channel 22 at any time by means of the first state receiver 242. According to a preferred configuration, the first state receiver 242 is connected between the second end 221 of the first disengagement channel 22 and the second terminal 202 of the braking disengagement switch 20. In other words, the first state receiver 242 is connected on the side of the second end 221 of the first disengagement channel 22, and is configured to detect the first state signal s1 between the second end 221 of the first disengagement channel 22 and the second motor phase v2 of the electric motor 10. The first state signal s1 is detected when the first disengagement channel 22 is in the closed state and the first state signal s1 passes through the first disengagement channel, from the first end 220 to the second end 221. The first state signal s1 is not detected when the first disengagement channel 22 is in the open state. Indeed, the first state signal s1 is not able to pass through the electric motor from the first motor phase v1 or the third motor phase v3 to the second motor phase v2 and is blocked by the windings of the electric motor 10. The first state receiver 242 is therefore configured to determine the state of the first disengagement channel 22.

When the first state signal s1 passes through the first disengagement channel 22 and is detected by the first state receiver 242, the first state signal does not reach the second motor phase v2 of the electric motor 10 when the electric motor is controlled by the controller 12. Indeed, when the electric motor 10 is controlled by the controller 12, the third channel p3 is in an open state so that the second motor phase v2 is not connected to the second end 221 of the first disengagement channel 22. The first state signal s1 is then not transmitted to the second motor phase v2. Furthermore, when the third channel p3 is in the closed state, then the first channel p1 and the second channel p2 are in the open state so that the electric motor 10 is no longer supplied by the controller 12. The third channel p3 is therefore used to filter the first state signal s1. Indeed, the third channel p3 allows the first state signal s1 to be isolated from the signal from the controller 12 in order to prevent the signal from the controller 12 from absorbing the first state signal s1 and generating incorrect detections of the first state receiver 242.

Figure 5:
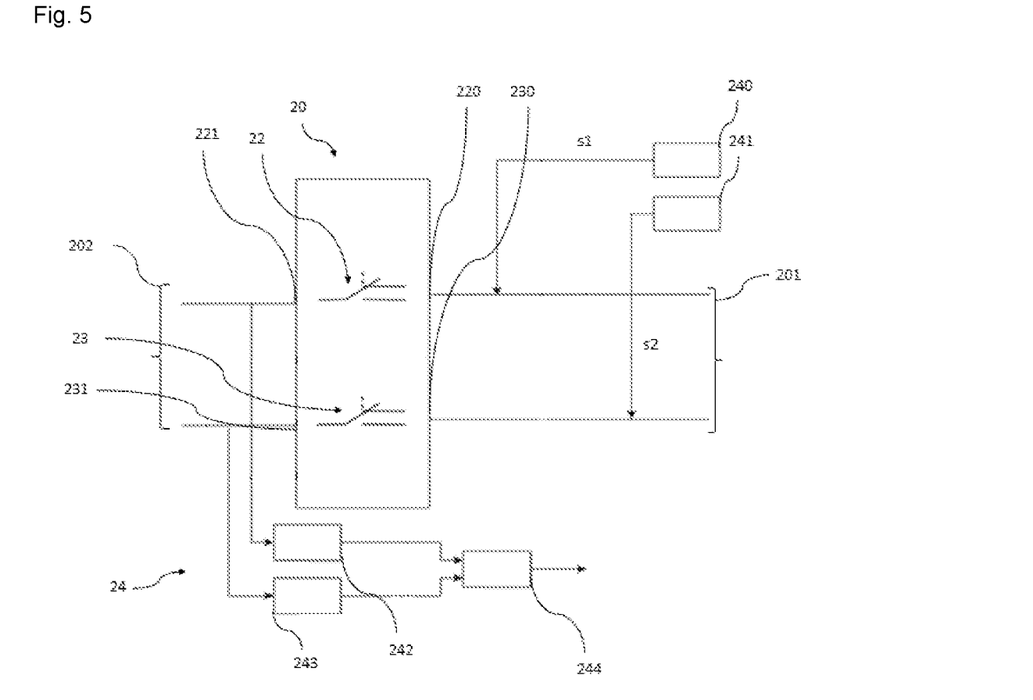
FIG. 5 shows a schematic view of the braking disengagement switch of FIG. 4 in a redundant configuration.

For the sake of safety and redundancy, it is also possible to contemplate that the braking disengagement switch 20 comprises the following, as shown in FIG. 5:

the first disengagement channel 22 connected at the first end 220 of the first disengagement channel 22 to the third motor phase v3 of the electric motor 10 and to the second phase v2 of the electric motor 10 via the third channel p3 at the second end 221 of the first disengagement channel 22;

a second disengagement channel 23 also connected to the third motor phase v3 of the electric motor 10 at a first end 230 of the second disengagement channel 23 and to the second phase v2 of the electric motor 10 at a second end 231 of the second disengagement channel 23.

The second disengagement channel 23 is thus placed parallel to the first disengagement channel 22. Furthermore, the first end 220 of the first disengagement channel 22 and the first end 230 of the second disengagement channel 23 combine in order to form the first terminal 201 of the braking disengagement switch 20, and the second end 221 of the first disengagement channel 22 and the second end 231 of the second disengagement channel 23 also combine in order to form the second terminal 202 of the braking disengagement switch 2.

The second disengagement channel 23 is also configured to switch between the open state and the closed state.

Furthermore, similarly, when the second disengagement channel 23 is in a closed or on state with respect to the current, the second motor phase v2 is connected to the third motor phase v3 so that the braking current inducing the braking torque is detectable between these two motor phases. Conversely, when the second disengagement channel 23 is in an open or off state with respect to the current, the braking current inducing the braking torque is no longer transmitted between the first end 230 of the second disengagement channel 23 and the second end 231 of the second disengagement channel 23.

Placing the first disengagement channel 22 and the second disengagement channel 23 parallel to each other, which addresses a problem of redundancy, also has the advantage of being adapted to safety standards regarding the electrical circuit.

Furthermore, the second motor phase v2 and the third motor phase v3 are not connected when the first disengagement channel 22 and the second disengagement channel 23 are simultaneously in an open state.

In addition, the state of the second disengagement channel 23 is dependent on the state of the first disengagement channel 22 and, more specifically, the state of the second disengagement channel 23 is identical to the state of the first disengagement channel 22. In other words, when the first disengagement channel 22 is closed, then the second disengagement channel 23 is also closed and, when the first disengagement channel 22 is open, then the second disengagement channel 23 is also open. However, unlike the electromechanical safety relay 14, the dependency link between the first disengagement channel 22 and the second disengagement channel 23 is not assured. In other words, when a change of state of the braking disengagement switch 20 is required, and the first disengagement channel 22 is immobilised in the initial state, the second disengagement channel 23 still switches to the required state without taking into account the dependency link between the first disengagement channel 22 and the second disengagement channel 23 and the fact that the first disengagement channel is not functional. This is notably the case when the first disengagement channel 22 is stuck and the braking disengagement switch 20 is instructed to transition to the open state. Consequently, only the second disengagement channel 23 switches to the open state without respecting the dependency link.

The monitoring device 24 is also configured to determine the state of the first disengagement channel 22 and the state of the second disengagement channel 23 at any time and to detect when the first disengagement channel 22 is in a state opposite the state of the second disengagement channel 23.

As shown in FIG. 5, the monitoring device 24 comprises:
the first state transmitter 240 connected to the first end 220 of the first disengagement channel 22, configured to inject a first state signal s1 towards the first disengagement channel 22;
and a second state transmitter 241 connected to the first end 230 of the second disengagement channel 23, configured to inject a second state signal s2 towards the second disengagement channel 23, between the first end 230 of the second disengagement channel 23 and the motor phase connected to the second disengagement channel 23, namely the first motor phase v1 or the third motor phase v3 of the electric motor 10. As previously stated, in the preferred configuration, the first state transmitter 240 is connected to the first disengagement channel 22 between the first end 220 of the first disengagement channel 22 and the first terminal 201 of the braking disengagement switch 20 and the second state transmitter 241 is connected to the second disengagement channel 23 between the first end 230 of the second disengagement channel 23 and the first terminal 201 of the braking disengagement switch 20. As shown in FIG. 5, the second state transmitter 241 is connected to the first end 230 of the second disengagement channel 23 so as to directly inject the second state signal s2 into the second disengagement channel 23. The second state transmitter 241 is positioned so as to inject the second state signal s2 from the first terminal 201 to the second terminal 202 by passing through the second disengagement channel 23. In other words, the second state transmitter 241 is connected to the electrical line connecting the first end 230 of the second disengagement channel 23 and the motor phase v1 or v3 of the electric motor 10 connected to the second disengagement channel 23, and is configured to inject the second state signal s2 towards the first end 230, between the first end 230 of the second disengagement channel 23 and the motor phase from among the first motor phase v1 or the third motor phase v3 of the electric motor 10 connected to the first terminal 201.

Although the second state signal s2 is transmitted between the first end 230 of the second disengagement channel 23 and the motor phase from among the first motor phase v1, shown in FIG. 2, or the third motor phase v3, shown in FIG. 1, of the electric motor 10 connected to the first terminal 201, the second state signal s2 is not able to pass through the electric motor 10 up to the second motor phase v2 and is blocked by the windings of the electric motor 10.

Indeed, the second state signal s2 is a high-frequency (HF) signal, with a high enough frequency to be filtered by the windings of the electric motor 10. The high inductance of the winding of the electric motor 10 advantageously allows the second state signal s2 to be blocked between the phases of the electric motor 10. In order to be filtered and blocked by the electric motor 10, the second state signal s2 is therefore a high-frequency signal relative to the inductance of the electric motor 10.

As for the first state signal s1, a ratio exists between the inductance L measurable on the electric motor 10 and the frequency $f_2$ of the second state signal s2. This ratio is preferably greater than $10^7$. In other words, the impedance relationship on the electric motor 10, according to the formula $JL\omega$, where J represents the complex number, L represents the inductance of the electric motor 10 and $\omega_2$ represents the pulse of the second state signal s2, with $\omega_2 = 2\pi f_2$, with $f_2$ being the frequency of the second state signal s2, must be greater than or equal to 100 ohms.

The first state transmitter 240 and the second transmitter 241 continuously transmit a high-frequency periodic signal, namely the first state signal s1 and the second state signal s2. By way of an indicative example, the first state transmitter 240 and the second transmitter 241 respectively transmit the first state signal s1 and the second state signal s2 at a frequency that is greater than 100 kHz.

Furthermore, similarly, the monitoring device 24 comprises a second state receiver 243 connected to the second end 231 of the second disengagement channel 23, parallel to the first state receiver 242. The second state receiver 243 is also configured to detect the second state signal s2 passing through the second disengagement channel 23 when the second disengagement channel is in the closed state. The second state receiver 243 is thus configured to determine the state of the second disengagement channel 23. According to a preferred configuration, the second state receiver 243 is connected to the second disengagement channel 23 between the second end 231 of the second disengagement channel 23 and the second terminal 202 of the braking disengagement switch 20. In other words, the second state receiver 243 is connected on the side of the second end 231 of the second disengagement channel 23, and is configured to detect the second state signal s2 between the second end 231 of the second disengagement channel 23 and the second motor phase v2 of the electric motor 10. The second state signal s2 is detected when the second disengagement channel 23 is in the closed state and the second state signal s2 passes through the second disengagement channel 23, from the first end 230 to the second end 231. The second state signal s2 is not detected when the second disengagement channel 23 is in the open state. Indeed, the second state signal s2 is not able to pass through the electric motor 10 from the first motor phase v1 or the third motor phase v3 to the second motor phase v2 and is blocked by the windings of the electric motor 10. The second state receiver 243 is therefore configured to determine the state of the second disengagement channel 23.

Furthermore, when the second state signal s2 passes through the second disengagement channel 23 and is detected by the second state receiver 243, the second state signal s2 does not reach the second motor phase v2 of the electric motor 10 when the electric motor 10 is controlled by the controller 12. Indeed, when the electric motor 10 is controlled by the controller 12, the third channel p3 is in an open state so that the second motor phase v2 is not connected to the second end 231 of the second disengagement channel 23. The second state signal s2 is then not transmitted to the second motor phase v2. Furthermore, when the third channel p3 is in the closed state, then the first channel p1 and the second channel p2 are in the open state so that the electric motor 10 is no longer supplied by the controller 12. The third channel p3 therefore can also filter the second state signal s2. Indeed, the third channel p3 allows the second state signal s2 to be isolated from the signal from the controller 12 in order to prevent the signal from the controller 12 from absorbing the second state signal s2 and generating incorrect detections of the second state receiver 243.

In addition, the monitoring device 24 comprises a device 244 for diagnosing the state of the braking disengagement switch 20 connected to the first state receiver 242 and to the second state receiver 243. The diagnostic device 244 is configured to compare the state, namely open or closed, of the first disengagement channel 22 returned by the first state receiver 242 and the state, namely open or closed, of the second disengagement channel 23 returned by the second state receiver 243. The diagnostic device 244 is used, by virtue of this state comparison, to determine whether the first disengagement channel 22 and the second disengagement channel 23 are actually in the same state and thus respect the dependency link. Conversely, if the diagnostic device 244 detects that the first disengagement channel 22 is in a different state from the state of the second disengagement channel 23, then the diagnostic device 244 detects a fault in the operation of one of the disengagement channels from among the first disengagement channel 22 and the second disengagement channel 23. By way of an indicative example, if the diagnostic device 244 detects that the first disengagement channel 22 is in the closed state and that the second disengagement channel 23 is in the open state, then the diagnostic device is able to highlight a fault in the operation of a disengagement channel.

Consequently, the diagnostic device 244 is also configured to determine, on the basis of the comparison, whether the disengagement switch 20 is in a functioning state or in a malfunctioning state, reflecting a malfunction of the first disengagement channel 22 or of the second disengagement channel 23. In other words, the diagnostic device 244 has the advantage of detecting whether there is a fault in one of the components on one of the transmission chains of the first state signal s1, i.e., between the first state transmitter 240 and the first state receiver 242 by passing through the first disengagement channel 22, or of the second state signal s2, i.e., between the second state transmitter 241 and the second state receiver 243 by passing through the second disengagement channel 23.

The monitoring device 24 thus has the advantage of allowing the correct operation of the various channels of the braking disengagement switch 20 to be checked without having to use a specific device provided with dedicated channels, the size of which would have been restrictive. Furthermore, such an assembly comprising the braking disengagement switch 20 and the monitoring device 24 has the advantage of being easy to integrate, since it connects only two motor phases, namely the second motor phase v2 and the third motor phase v3 of the electric motor 10, and of being a simple component.

Figure 6:
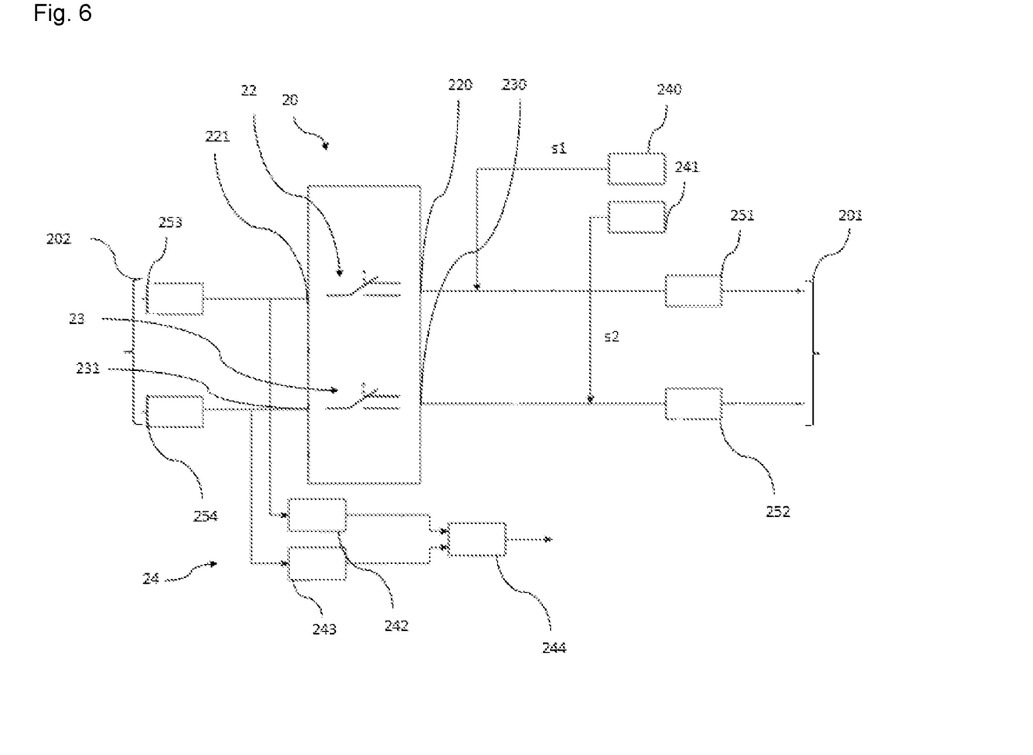
FIG. 6 shows a schematic view of the braking disengagement switch of FIG. 5 comprising a filter system.

Advantageously, the braking disengagement switch 20 can comprise, as shown in FIG. 6, a first filter 251 positioned between the motor phase from among the first motor phase v1 or the third motor phase v3 of the electric motor 10 connected to the first disengagement channel 22 and the first end 220 of the first channel 22. The first state transmitter 240 injects the first state signal s1 between the first end 220 of the first disengagement channel 22 and the first filter 251. The first filter 251 is configured to isolate the signals from the electric motor 10, i.e., the signal originating from the third motor phase v3 according to the architecture of FIG. 1, or originating from the first motor phase v1 according to the architecture of FIG. 2, and the first state signal s1 on each side of the first filter 251. The first filter 251 is configured to prevent an interfering signal originating from the electric motor 10, from the first motor phase v1 or from the third motor phase v3, from passing through the first filter 251 and reaching the first end 220 of the first disengagement channel. In other words, the first filter 251 advantageously prevents the first state signal s1 from being mixed with the signals originating from the electric motor 10 via the first motor phase v1 or the third motor phase v3. The detection of the first state signal s1 by the first state receiver 242 is thus facilitated.

Advantageously, the first filter 251 can also prevent the first state signal s1 from passing through the first filter 251 and reaching the electric motor 10. The first state signal s1 is then no longer blocked by the electric motor 10 but by the first filter 251.

In other words, the first filter 251 can have two functions:
to prevent an interfering signal, originating from a motor phase from among the first motor phase v1 or the third motor phase v3, from being detected by the first state receiver 242 if the first disengagement channel 22 is closed and the first state transmitter 240 is malfunctioning. When the first state transmitter 240 is malfunctioning, the first state signal s1 is not generated and the first state receiver 242 does not detect it, irrespective of whether the first disengagement channel 22 is in the closed or open state;
and to prevent the first state signal s1 from being absorbed by the controller 12 of the electric motor 10.

Advantageously, the braking disengagement switch 20 can comprise a second filter 252 positioned between the third motor phase v3 of the electric motor 10 and the first end 230 of the second channel 23. The second state transmitter 241 injects the second state signal s2 between the first end 230 of the second disengagement channel 23 and the second filter 252.

The second filter 252 is configured to isolate the signals from the electric motor 10, i.e., the signal originating from the third motor phase v3 according to the architecture of FIG. 1, or originating from the first motor phase v1 according to the architecture of FIG. 2, and the second state signal s2 on each side of the second filter 252.

The second filter 252 is configured to prevent an interfering signal originating from the electric motor 10, from the first motor phase v1 or from the third motor phase v3, from passing through the second filter 252 and reaching the first end 230 of the second disengagement channel 23.

The second filter 252 can also prevent the second state signal s2 from passing through the second filter 252 and reaching the electric motor 10. The electric motor 10 no longer blocks the second state signal s2, which is already filtered by the second filter 252.

In other words, the second filter 252 can have two functions:
to prevent an interfering signal originating from a motor phase from among the first motor phase v1 or the third motor phase v3, from being detected by the second state receiver 243 if the second disengagement channel 23 is closed and the second state transmitter 241 is malfunctioning. When the second state transmitter 241 is malfunctioning, the second state signal s2 is not generated and the second state receiver 243 does not detect it, irrespective of whether the second disengagement channel 23 is in the closed or open state;
to prevent the second state signal s2 from being absorbed by the controller 12 of the electric motor 10.

The first filter 251 and the second filter 252 respectively allow the first state signal s1 and the second state signal s2 to be isolated at 1 MHz of the motor controller chopped at 40 kHz. The first filter 251 and the second filter 252 are thus capable of filtering the high-frequency harmonics of the motor controller so as not to pollute the first state receiver 242 and the second state receiver 243 with signals of the motor controller. The first filter 251 and the second filter 252 also respectively ensure that the first signal s1 and the second state signal s2 are not absorbed by the controller 12.

By way of an indicative example, the first filter 251 and the second filter 252 can be T-type low-pass filters, comprising two inductors and a capacitor, with a cut-off frequency of the order of 400 kHz.

As an alternative embodiment, the first filter 251 and the second filter 252 are bandpass filters.

The braking disengagement switch 20 can comprise a third filter 253 connected to the second end 221 of the first channel 22, configured to filter the first state signal s1 transmitted by the first state transmitter 240. More specifically, the third filter 253 is connected to the second end 221 of the first channel 22 and to the second motor phase v2 of the electric motor 10. The first state receiver 242 detects the first state signal s1 between the second end 221 of the first disengagement channel 22 and the third filter 253.

Furthermore, similarly, the braking disengagement switch 20 can comprise a fourth filter 254 connected to the second end 231 of the second channel 23, configured to filter the second state signal s2 transmitted by the second state transmitter 241. More specifically, the fourth filter 254 is connected to the second end 231 of the second channel 23 and to the second motor phase v2 of the electric motor 10. The second state receiver 243 detects the second state signal s2 between the second end 231 of the second disengagement channel 23 and the fourth filter 254.

The third filter 253 prevents the first state signal s1 from travelling beyond the second terminal 202 in order to return via the second terminal 202 and be detected by the second state receiver 243.

The third filter 253 can also isolate the signal originating from the second motor phase v2 and the first state signal s1 on each side of the third filter 253. The third filter 253 can also prevent the first state signal s1 from passing through the third filter 253 and reaching the electric motor 10 via the second motor phase v2. The third filter 253 thus allows the first state signal s1 to be blocked, irrespective of the state of the third channel p3, which also means that the second motor phase v2 may or may not be connected to the braking disengagement switch 20.

Furthermore, similarly, the fourth filter 254 prevents the second state signal s2 from travelling beyond the second terminal 202 in order to return via the second terminal 202 and be detected by the first state receiver 242.

The fourth filter 254 can also isolate the signal originating from the second motor phase v2 and the second state signal s2 on each side of the fourth filter 254. The fourth filter 254 can thus prevent the second state signal s2 from passing through the fourth filter 254 and reaching the electric motor 10 via the second motor phase v2.

In other words, the third filter 253 and the fourth filter 254 prevent the first state signal s1 and the second state signal s2 from conflicting. The third filter 253 and the fourth filter 254 thus act as a buffer or separator between the first state signal s1 and the second state signal s2.

By way of an indicative example, the third filter 253 and the fourth filter 254 can be T-type low-pass filters, comprising two inductors and a capacitor, with a cut-off frequency of the order of 400 kHz.

As an alternative embodiment, the third filter 253 and the fourth filter 254 are bandpass filters.

Indeed, without the presence of the third filter 253 and the fourth filter 254, if the second disengagement channel 23 is open while the first disengagement channel 22 is closed, the second state receiver 243 definitely does not receive the second state signal s2 but only the first state signal s1, which is not intended to be detected in the second disengagement channel 23, and yet switches to the closed state when the second disengagement channel 23 is open, which indicates a malfunction in the diagnosis of the state of the braking disengagement switch 20.

Furthermore, it is also possible to contemplate using the first filter 251 and the third filter 253 in the configuration of FIG. 4, in which the first disengagement switch 20 comprises only the first disengagement channel 22.

Figure 7:
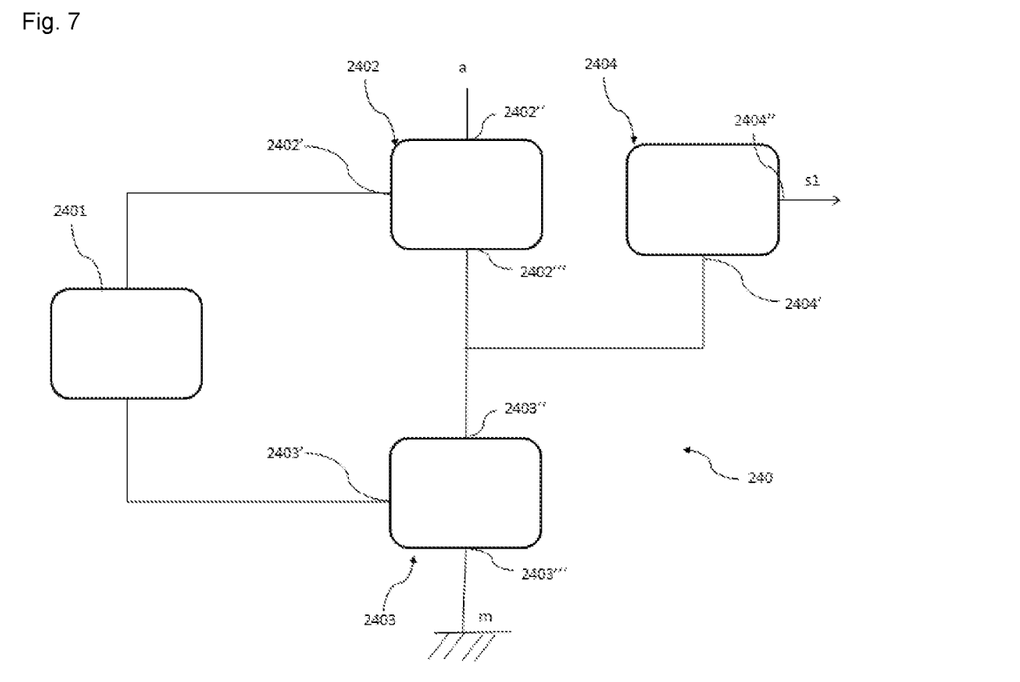
FIG. 7 shows a schematic view of an architecture of a first transmitter of the braking disengagement switch of FIG. 6.

Advantageously, the first state transmitter 240 can comprise, as shown in FIG. 7:
- a first controller 2401 configured to generate the first state signal s1 towards the first disengagement channel 22;
- a first transistor 2402 controlled by the controller 2401, connected to the first controller 2401 at a first terminal 2402' and connected to a power supply a at a second terminal 2402". The first transistor 2402 also comprises a third terminal 2402'";
- a second transistor 2403 also connected to the first controller 2401 via a first terminal 2403', connected to a ground m via a third terminal 2403'" and connected to the third terminal 2402'" of the first transistor 2402 via a second terminal 2403".

The first transistor 2402 and the second transistor 2403 are therefore placed in parallel so as to be able to operate at a higher current and power. The first transistor 2402, the second transistor 2403 and the first controller 2401 form a chopper that interrupts the voltage of the power supply a at a frequency of 1 MHz. This chopping allows significant voltage to be delivered so as to be less polluted by the controller 12 and to minimise circuit losses.

The first transmitter 240 can also comprise a first filtering means 2404 connected at a first terminal 2404' of the first filtering means 2404 to the third terminal 2402'" of the first transistor 2403 and to the second terminal 2403" of the second transistor 2403 and at a second terminal 2404" of the first filtering means 2404 to the first end 220 of the first disengagement channel 22.

The first filtering means 2404 is, for example, a low-pass filter comprising an inductor and a capacitor with a cut-off frequency of approximately 2 MHz, allowing the harmonics of the chopper to be filtered and providing a quasi-sinusoidal signal of the first state signal s1 in order to limit radio transmissions and so as not to degrade the electromagnetic compatibility of the vehicle.

As an alternative embodiment, the first transmitter 240 can be a system transmitting a periodic sine or triangular or square or sawtooth signal.

Furthermore, the first transistor 2402 and the second transistor 2403 can be bipolar transistors or field-effect transistors.

Advantageously, the first transistor 2402 can comprise a freewheeling diode connected via a cathode of the first freewheeling diode to the second terminal 2402" of the first transistor 2402 and via an anode of the first freewheeling diode to the third terminal 2402'" of the first transistor 2402.

Furthermore, the second transistor 2403 can comprise a second freewheeling diode connected via an anode of the second freewheeling diode to the third terminal 2403'" of the second transistor 2403 and via a cathode of the second freewheeling diode to the second terminal 2403" of the second transistor 2403.

The use of the first freewheeling diode and of the second freewheeling diode has the advantage of protecting the first transistor 2402 and the second transistor 2403 against an overvoltage when an inductive load is opened.

Figure 8:
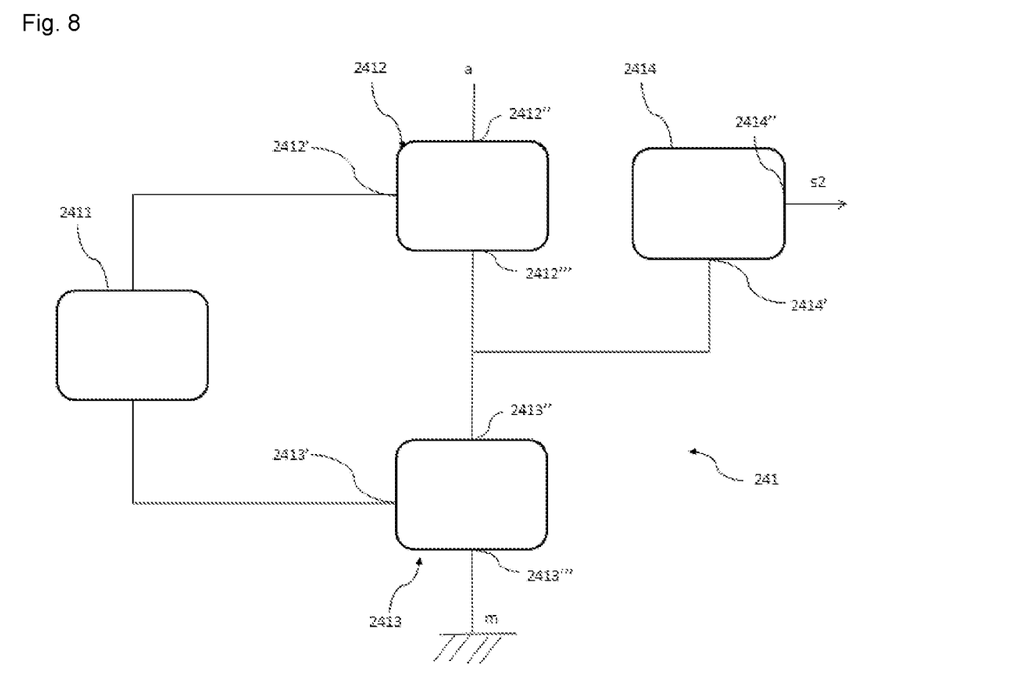
FIG. 8 shows a schematic view of an architecture of a second transmitter of the braking disengagement switch of FIG. 6.

Furthermore, similarly, the second state transmitter 241 comprises, as shown in FIG. 8:
- a second controller 2411 configured to generate the second state signal s2 towards the second disengagement channel 23;
- a third transistor 2412, controlled by the second controller 2411, comprising a first terminal 2412' of the third transistor 2412 connected to the second controller 2411 and comprising a second terminal 2412" of the third transistor 2412 connected to the power supply a and comprising a third terminal 2412''';
- a fourth transistor 2413 comprising a first terminal 2413' of the fourth transistor 2413 connected to the second controller 2411 and comprising a third terminal 2413''' of the fourth transistor 2413 connected to the ground m and comprising a second terminal 2413" of the fourth transistor 2413 connected to the third terminal 2412''' of the third transistor 2412;
- a second filtering means 2414 connected at a first terminal 2414' of the second filtering means 2414 to the second terminal 2413" of the fourth transistor 2413 and to the third terminal 2412" of the third transistor 2412 and at a second terminal 2414" of the second filtering means 2414 to the first end 230 of the second disengagement channel 23.

The third transistor 2412, the fourth transistor 2413 and the second controller 2411 form a chopper that interrupts the voltage of the power supply a at a frequency of 1 MHz. This chopping allows significant voltage to be delivered so as to be less polluted by the controller 12 and to minimise circuit losses.

The second filtering means 2414 is, for example, a low-pass filter comprising an inductor and a capacitor with a cut-off frequency of approximately 2 MHz allowing the harmonics of the chopper to be filtered and providing a quasi-sinusoidal signal of the first state signal s1 in order to limit radio transmissions and so as not to degrade the electromagnetic compatibility of the vehicle.

As an alternative embodiment, the second transmitter 241 can be a system transmitting a periodic sine or triangular or square or sawtooth signal.

Furthermore, the third transistor 2412 and the fourth transistor 2413 can be bipolar transistors or field-effect transistors.

Advantageously, the third transistor 2412 can comprise a third freewheeling diode connected via a cathode of the third freewheeling diode to the second terminal 2412" of the third transistor 2412 and via an anode of the third freewheeling diode to the third terminal 2412''' of the third transistor 2412.

Furthermore, the fourth transistor 2413 can comprise a fourth freewheeling diode connected via an anode of the fourth freewheeling diode to the third terminal 2413''' of the fourth transistor 2413 and via a cathode of the fourth freewheeling diode to the second terminal 2413" of the fourth transistor 2413.

The use of the third freewheeling diode and of the fourth freewheeling diode has the advantage of protecting the third transistor 2412 and the fourth transistor 2413 against an overvoltage when an inductive load is opened.

As an alternative embodiment, the first controller 2401 and the second controller 2411 can be combined.

It is also possible to contemplate combining the first signal transmitter 240 and the second signal transmitter 241 in order to reduce the volume of the assembly.

Figure 9:
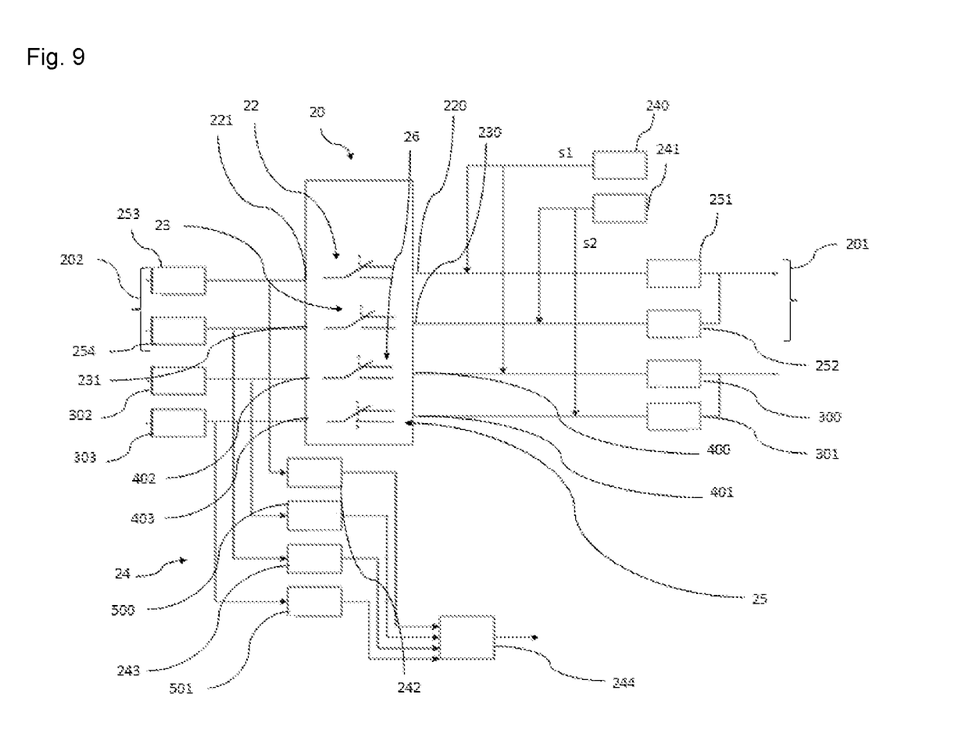
FIG. 9 shows a schematic view of a complete configuration of the braking disengagement switch for two drive wheels according to the invention.

FIG. 9 shows a schematic view of the braking disengagement switch 20 applied to two drive wheels. Thus, the braking disengagement switch 20 can comprise more than two channels, namely a main channel and a secondary redundancy channel, and, according to the example of FIG. 9, four channels. More specifically, the braking disengagement switch 20 comprises two channels, namely the first disengagement channel 22 and the second disengagement channel 23, intended to allow a first drive wheel to be disengaged from a first electric motor, and two other channels, namely a third disengagement channel 26 and a fourth disengagement channel 25, intended to allow a second drive wheel to be disengaged from a second electric motor. The third disengagement channel 26 is thus identical to the first disengagement channel 22, i.e., it is a main channel, and the fourth disengagement channel 25 is identical to the second disengagement channel 23, i.e., it is a secondary channel. Consequently, the first state transmitter 240 is configured to inject the first state signal s1 towards the first disengagement channel 22 and towards the third disengagement channel 26, and the second state transmitter 241 is configured to inject the second state signal s2 towards the second disengagement channel 23 and towards the fourth disengagement channel 25.

In a similar manner to the first disengagement channel 22 and the second disengagement channel 23, the third disengagement channel 26 and the fourth disengagement channel 25 can respectively comprise:
- a fifth filter 300 positioned between a third phase of the second electric motor and a first end 400 of the third disengagement channel 26. The fifth filter 300 is identical to the first filter 251;
- a sixth filter 301 positioned between the third motor phase of the second electric motor and a first end 401 of the fourth disengagement channel 25, identical to the second filter 252;
- a third state receiver 500 connected to a second end 402 of the third disengagement channel 26. The third state receiver 500 is configured to detect the first state signal s1 passing through the third disengagement channel 26 when the third disengagement channel 26 is in the closed state, in the same way as the first state receiver 242;
- a fourth state receiver 501 connected to a second end 403 of the fourth disengagement channel 25, parallel to the third state receiver 500. The fourth state receiver 501 is also configured to detect the second state signal s2 passing through the fourth disengagement channel 25 when the fourth disengagement channel 25 is in the closed state;
- the diagnostic device 244, which is then connected to the first state receiver 242, the second state receiver 243, the third state receiver 500 and the fourth state receiver 501 so as to compare the state, namely, open or closed, of the first disengagement channel 22 and the state, namely, open or closed, of the third disengagement channel 26 and the state, namely, open or closed, of the second disengagement channel 23 and the state, namely, open or closed, of the fourth disengagement channel 25. In other words, the diagnostic device 244 compares the detection of the first state signal s1 in the channels in which the first state signal s1 is transmitted and compares the detection of the second state signal s2 in the channels in which the second state signal s2 is transmitted. Furthermore, the diagnostic device 244 also operates so as to compare the state of the other disengagement channels, namely the first disengagement channel 22, the second disengagement channel 23, the third disengagement channel 26 and the fourth disengagement channel 25;

a seventh filter 302 connected between the second end 402 of the third disengagement channel 26 and a second motor phase of the second electric motor, configured to filter the first state signal s1 transmitted by the first state transmitter 240, in a similar way to the third filter 253;

an eighth filter 303 connected between the second end 403 of the fourth channel 25 and a second motor phase of the second electric motor, configured to filter the second state signal s2 transmitted by the second state transmitter 241, in a similar way to the fourth filter 254.

Thus, the invention relates to a braking disengagement switch 20 allowing a braking device 1 to be decoupled from the electric motor 10 and from the drive wheel in a braking situation so as to allow the drive wheel to be left free. The braking disengagement switch 20 is used to disconnect two motor phases of an electric motor 10 comprising at least two phases, with these two phases being connected together. These two interconnected motor phases can be the two motor phases of the two-phase electric motor, i.e., the first motor phase v1 and the second motor phase v2, as shown in FIG. 3. In a three-phase motor, these two motor phases connected to each other can be the second motor phase v2 and the third motor phase v3, as shown in FIG. 1, or the first motor phase v1 and the third motor phase v3, as shown in FIG. 2. The disengagement switch has the advantage of being compact, easy to integrate into the vehicle braking system 1 and of having a low financial cost. However, the invention also relates to a braking device 1 as shown in FIG. 1, comprising the disengagement switch 20 and the device 24 for monitoring the disengagement switch. The invention also relates to a vehicle configured to move in a travel zone and comprising the electric motor 10, the controller 12, the electromechanical safety relay 14 and the braking disengagement switch 20, and being capable of moving autonomously or of being remotely controlled, such as, for example, an autonomous or controlled robot such as an autonomous delivery robot.

The invention claimed is:

1. A magnetic braking disengagement switch for a drive wheel set into rotation by an electric motor comprising at least two motor phases, the disengagement switch comprising a first disengagement channel intended to be connected at a first end of the first disengagement channel to a motor phase (v1, v3) of the electric motor and to a second motor phase (v2) of the electric motor at a second end of the first disengagement channel, the first disengagement channel being configured to switch between an open state and a closed state, the disengagement switch comprising a device for monitoring the state of the first disengagement channel, the monitoring device comprising:
 a first state transmitter connected to the first end of the first disengagement channel, configured to inject a first state signal (s1) between the first end of the first disengagement channel and the motor phase (v1, v3) of the electric motor;
 a first state receiver connected to the second end of the first disengagement channel, the first state receiver being configured to detect the first state signal (s1) passing through the first disengagement channel when the first disengagement channel is in the closed state, the first state receiver being configured to determine the state of the first disengagement channel.

2. The magnetic braking disengagement switch according to claim 1, comprising a first filter positioned between the motor phase (v1, v3) of the electric motor and the first end of the first disengagement channel, the first filter being configured to receive and filter a signal from the motor phase (v1, v3) of the electric motor.

3. The magnetic braking disengagement switch according to claim 1, wherein the first state transmitter comprises:
 a first controller configured to generate the first state signal (s1);
 a first transistor connected to the first controller at a first terminal, connected to a power supply (a) at a second terminal and comprising a third terminal;
 a second transistor connected to the first controller via a first terminal, connected to a ground (m) via a third terminal and connected to the third terminal of the first transistor via a second terminal;
 a first filtering means connected at a first terminal of the first filtering means to the third terminal of the first transistor and to the second terminal of the second transistor and at a second terminal of the first filtering means to the first end of the first disengagement channel.

4. The magnetic braking disengagement switch according to claim 1, wherein the first state signal (s1) is a periodic signal with a frequency that is greater than or equal to 100 kHz.

5. The magnetic braking disengagement switch according to claim 1, wherein the first filter is a low-pass filter.

6. The magnetic braking disengagement switch as claimed in claim 5, wherein the first filter is a T-type filter comprising two inductors and a capacitor.

7. The magnetic braking disengagement switch according claim 1, comprising a third filter connected to the second end of the first disengagement channel, configured to filter the first state signal (s1) transmitted by the first state transmitter.

8. The magnetic braking disengagement switch according to claim 7, comprising a second filter positioned between the motor phase (v3) of the electric motor and the first end of the second disengagement channel, configured to receive and filter a signal from the motor phase (v3) of the electric motor.

9. The magnetic braking disengagement switch according to claim 8, wherein the second filter is a low-pass filter.

10. The magnetic braking disengagement switch according to claim 9, wherein the second filter is a T-type filter comprising two inductors and a capacitor.

11. The magnetic braking disengagement switch according to claim 7, comprising a fourth filter connected to the second end of the second disengagement channel, configured to filter the second state signal (s2) transmitted by the second state transmitter.

12. The magnetic braking disengagement switch according to claim 1, comprising a second disengagement channel connected to the motor phase of the electric motor at a first end of the second disengagement channel and to the second motor phase (v2) of the electric motor at a second end of the second disengagement channel, the second disengagement channel being configured to switch between an open state and a closed state, the second disengagement channel being configured to be in the same state as the first disengagement channel, the monitoring device being configured to monitor the state of the second disengagement channel, the monitoring device comprising:
 a second state transmitter connected to the first end of the second disengagement channel, configured to inject a second state signal (s2) between the first end of the second disengagement channel and the motor phase (v1, v3) of the electric motor;
 a second state receiver connected to the second end of the second disengagement channel, the second state receiver being configured to detect the second state signal (s2) passing through the second disengagement channel when the second disengagement channel is in the closed state, the second state receiver being configured to determine the state of the second disengagement channel;

a device for diagnosing the state of the disengagement switch, the diagnostic device being connected to the first state receiver and to the second state receiver, the diagnostic device being configured to compare the state of the first disengagement channel and the state of the second disengagement channel, the diagnostic device being configured to determine, on the basis of the comparison, whether the disengagement switch is in a functioning state or in a malfunctioning state.

13. The magnetic braking disengagement switch according to claim 12, wherein the second state transmitter comprises:

a second controller configured to generate the second state signal (s2);

a third transistor comprising a first terminal of the third transistor connected to the second controller and comprising a second terminal of the third transistor connected to a power supply (a) and comprising a third terminal;

a fourth transistor comprising a first terminal of the fourth transistor connected to the second controller and comprising a third terminal of the fourth transistor connected to a ground (m) and comprising a second terminal of the fourth transistor connected to the third terminal of the third transistor;

a second filtering means connected, at a first terminal of the second filtering means, to the second terminal of the fourth transistor and to the third terminal of the third transistor and, at a second terminal of the second filtering means, to the first end of the second disengagement channel.

14. The magnetic braking disengagement switch according to claim 12, wherein the second state signal (s2) is a periodic signal with a frequency that is greater than or equal to 100 kHz.

15. The magnetic braking disengagement switch according to claim 1, wherein the electric motor comprises three motor phases (v1, v2, v3), with the motor phase being a motor phase from among the first motor phase (v1) or the third motor phase (v3).

16. A vehicle configured to move in a travel zone, the vehicle comprising the magnetic braking disengagement switch according to claim 1.

* * * * *